Dec. 26, 1950          P. C. NEILSEN          2,535,088
RASP UNIT
Filed Aug. 8, 1947                                      2 Sheets—Sheet 1
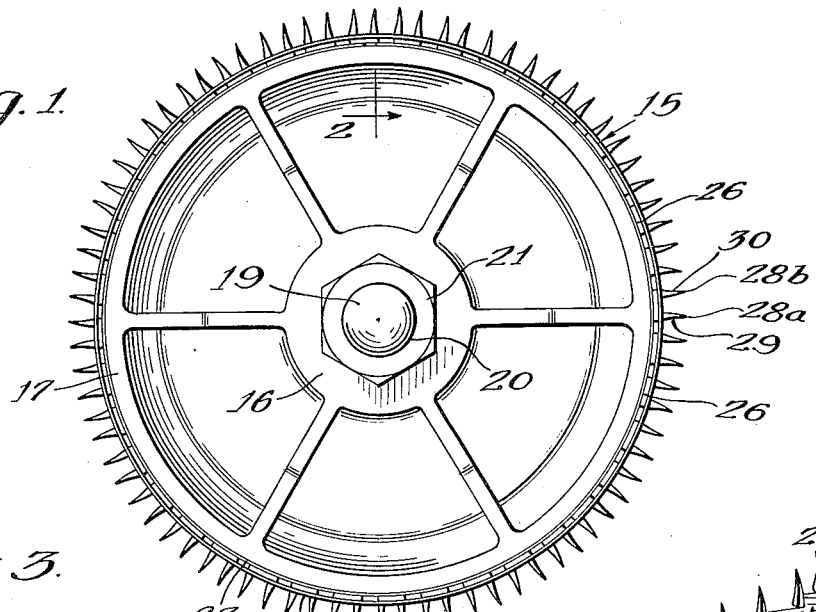
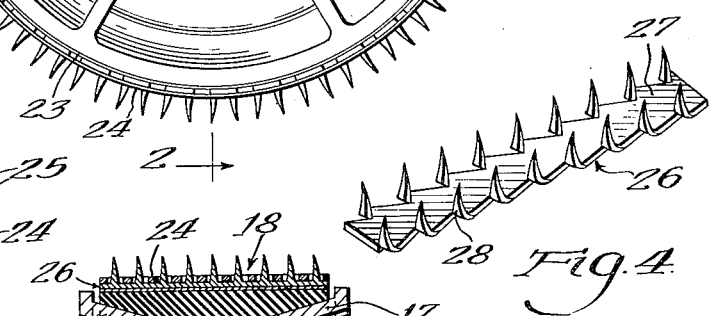
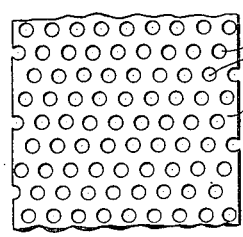
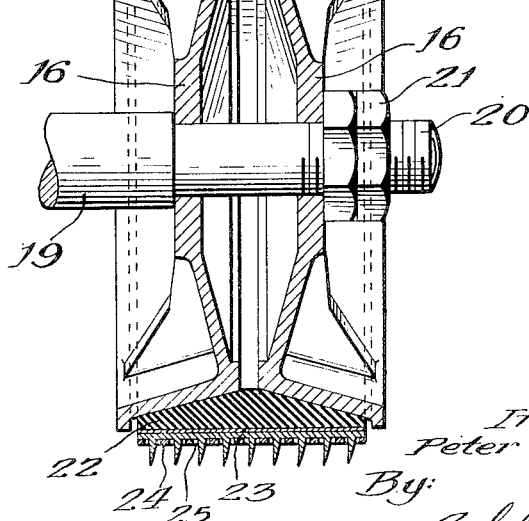
Inventor:
Peter C. Neilsen
By:
Zabel & Gritzbaugh
Attorneys Dec. 26, 1950 P. C. NEILSEN 2,535,088
RASP UNIT
Filed Aug. 8, 1947 2 Sheets-Sheet 2

Inventor:
Peter C. Neilsen
By Zahl & Fritzbaugh
Attorneys

Patented Dec. 26, 1950

2,535,088

UNITED STATES PATENT OFFICE 2,535,088

RASP UNIT

Peter C. Neilsen, Chicago, Ill.

Application August 8, 1947, Serial No. 767,587

1 Claim. (Cl. 29—78)

The present invention relates to tire rasps and particularly to a toothed element for a tire rasp and the method of making same. The invention is particularly applicable to a drum type of rasp wherein a perforated steel band or perforated teeth holders are mounted on a drum or wheel. This wheel in turn is mounted on a shaft or arbor for rotation and a plurality of sharp teeth project outwardly from the peripheral face of the thus banded wheel. As the wheel is rotated at a relatively high velocity the moving teeth form an effective abrading surface against which a rubber tire may be applied for preparing the tire surface for vulcanizing or recapping.

An object of the invention is to provide a relatively inexpensive toothed element for use on such a rasp and one that can be easily and simply replaced. It is further intended to provide such an element that is effective and efficient in performing its intended buffing action and one that has a relatively long life compared with conventional rasp teeth.

Further and other objects of the present invention will become apparent from the following description and from the drawings, in which Fig. 1 is a side elevational view of a completely assembled rasp embodying the present invention;

Fig. 2 is a vertical sectional view through the rasp taken on the line 2—2 of Fig. 1;

Fig. 3 is a fragmentary plan view of the peripheral band that holds the toothed elements on the drum;

Fig. 4 is an enlarged perspective view of one of the toothed elements;

Figure 5:
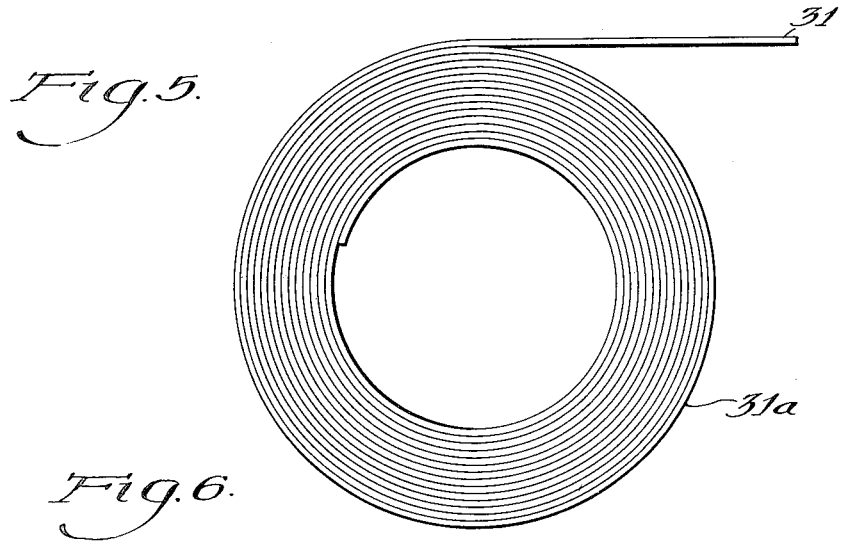
Fig. 5 is a side elevational view of a coil of metal stripping from which the toothed elements are manufactured.

For purposes of illustration a single embodiment of the present invention is shown and described herein. It is recognized, of course, that numerous modifications can be made in this specific embodiment without departing from the intended scope of the invention.

Referring to the drawings and particularly to Figs. 1 to 3 inclusive, the invention is illustrated in conjunction with a rasp generally indicated at 15 that includes a drum made up of a pair of web faces 16 that are provided with peripheral flanges 17 on which is supported an annular band generally indicated at 18. The assembly is mounted on a shaft or arbor 19 that is threaded at one end as at 20 to receive one or more nuts 21.

The band 18 comprises an annular cushion element 22 about which is mounted an annular backing sheet 23. A perforated tooth element holding member 24 is mounted circumferentially about the backing sheet 23 and as shown in Fig. 3 this holding member 24 is perforated throughout its area as indicated at 25, the perforations being arranged in horizontal alignment extending transversely across the holding member. A toothed element 26 in the form of a relative flat plate-like member 27 is provided along its marginal side edges with a plurality of teeth 28 that all extend in the same direction substantially at right angles to the plane of the plate-like member 27. These toothed members 26 are adapted to be held by the holding member 24 with the plate-like portion 27 resting against the underneath face of the holding member 24 and the teeth projecting through the apertures 25 in the holding member 24.

Figure 8:
Fig. 8 is a plan view of part of the strip of metal shown in Fig. 5 but showing a toothed element formed from this strip.
Figure 9:
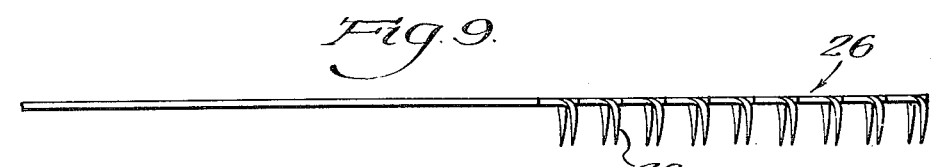
Fig. 9 is an elevational view of the toothed element and strip shown in Fig. 8.
Figures 10, 11:
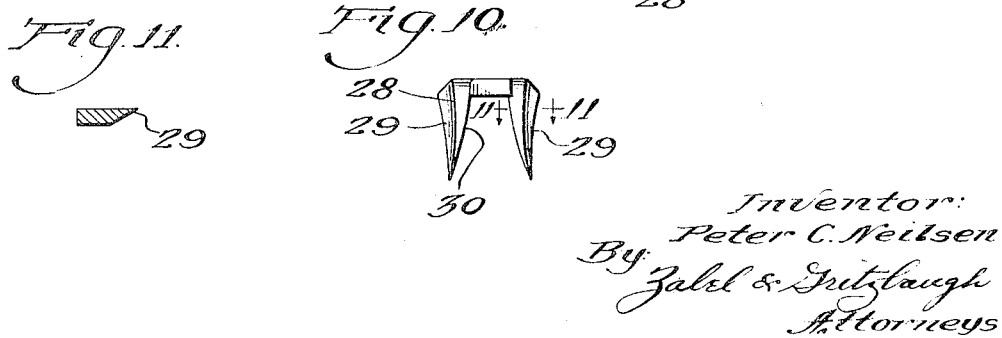
Fig. 10 is an elevational view of the toothed element illustrated in Figs. 8 and 9.
Fig. 11 is a transverse sectional view taken through one of the teeth, the view being taken on the line 11—11 of Fig. 10.

Referring now to Figs. 4 and 8 to 10 inclusive the teeth 28 of the toothed elements 26 are each provided with a chisel or cutting edge 29 that faces outwardly in a lateral direction along the outer vertical edge of each tooth. The inner face 30 of each tooth is relatively blunt. As shown in Fig. 9 each tooth is slightly curved from top to bottom toward one end of the tooth element 26 and as shown in Fig. 10 the teeth on both sides of the toothed element toe outwardly and are sharpened to a relatively sharp point. As shown in Figs. 4, 8 and 9 the teeth are spaced substantially at equal distances along both edges of the toothed element 26 and the teeth along one edge are out of alignment with respect to the teeth along the other edge of the toothed element so that in effect the teeth on both edges are staggered.

Referring to Fig. 1 let it be assumed that the rasp 15 is rotated in a clockwise direction on the shaft or arbor 19. One of the toothed elements 26 is designated by the reference character 26 in Fig. 1 and in this toothed element the row of teeth indicated at 28a would include the leading teeth since the rasp is rotating in a clockwise direction, whereas the row of teeth 28b would include the following teeth. The leading edge of each of the leading teeth in row 28a is the chisel or sharp edge 29 illustrated in Fig. 10, whereas the opposite edge 30 of each of the teeth 28a constitutes the blunt edge illustrated in Fig. 11. Each of the teeth in row 28b has its sharp or chisel edge disposed on the rear side with respect to the direction of rotation of the rasp 15.

In its operation the rasp 15 is rotated and an automobile tire casing or the like to be vulcanized or recapped is brought into engagement with the rotating teeth on the rasp 15. A very effective buffing action is produced due to the sharpness of the teeth, their relative curvatures, and the provision of chisel edges along the leading edges of the alternate rows of teeth.

Since the chisel edges of the teeth arranged in the alternate rows 28b are disposed on the rear sides of the teeth with respect to the direction of rotation of the rasp 15, an abrading action takes place between these teeth and the emery contents in the rubber of the tire casing being buffed which provides a very effective sharpening action along these chisel edges of the teeth. Thus while the rows of teeth corresponding to row 28a are cutting into the rubber to provide the buffing action, the next rows of teeth 28b tend to utilize their forward blunt edges to remove or scrape away rubber that is cut by the forward teeth 28a, while at the same time the chisel edges of the teeth in rows corresponding to 28b are being sharpened. Thus after a certain number of tires have been buffed with the present device it is desirable to remove the rasp 15 from its arbor and reverse its position on the arbor so that upon continued use for an additional corresponding number of tires the chisel edges of teeth 28b would be accomplishing the cutting action, whereas the chisel edges of the teeth in rows 28a would be sharpened as previously described. This feature lengthens the life of the teeth and permits a given set of toothed elements 26 to be used over and over again on a considerable number of tires.

The replacement of worn out or broken toothed elements can be simply accomplished by merely disassembling the rasp 15 by first removing nut or nuts 21 and withdrawing the rasp elements from the arbor 19. This allows for separation of the various elements making up the rasp band 18 so that the worn out or broken toothed element 26 may be removed and replaced with a new one.

Figure 6:
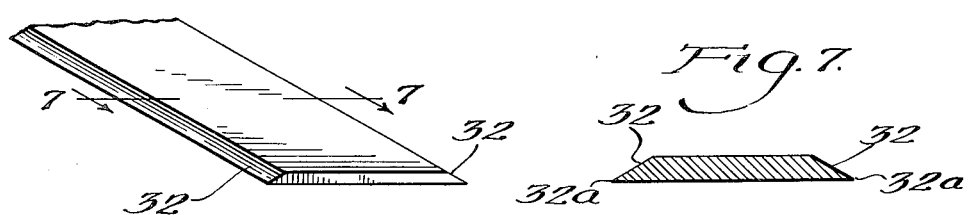
Fig. 6 is an enlarged, fragmentary, perspective view of a strip of metal that is shown in coil form in Fig. 5.
Figure 7:
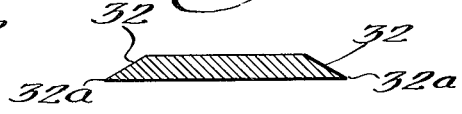
Fig. 7 is a transverse sectional view through the strip of metal taken along the line 7—7 of Fig. 6.

The toothed element 26 may be manufactured in a very simple manner. A metal strip 31 from a roll 31a may be fed through a machine that bevels the side edges as indicated at 32 in Figs. 6 and 7. This beveling should be accomplished to provide a sharp chisel edge 32a which as will become apparent provides the chisel edges 29 of the teeth that are to be formed. This beveled edge can either be formed by rolling or grinding or the like or the edges may be molded into shape to produce the chisel or knife like edge 32a.

The strip is next fed into a punch or a similar device that cuts and bends the teeth 28 to the position shown in Figs. 8 to 10 inclusive. The toothed elements thus formed are then cut off from the continuous strip 31 and then the element is ready for use in the rasp 15.

As previously mentioned the teeth are disposed with their points hooked outwardly away from the longitudinal center line of the toothed element. This allows the leading teeth on each toothed element to feed or dig into the surface of the tire that is applied to the rasp during the buffing operation.

I claim:

A rasp unit comprising a strip of steel having a plurality of elongated, sharp pointed cutting and abrading prongs projecting upwardly therefrom and spaced along opposite longitudinal edges thereof, the prongs along one edge being staggered with respect to the prongs along the other edge, each prong on each side of the strip having a sharp cutting edge which extends along the full length thereof, the cutting edges of the prongs along one edge of the strip being oppositely facing with respect to the cutting edges of the prongs along the other edge of the strip, each facing outwardly of the strip in a direction transversely of the length thereof, the side face of each prong opposite said cutting edges being flat and positioned inwardly of said strip, said cutting edge of each prong lying along the outer edge of the strip, each prong being curved in a direction outwardly of the strip, whereby as the strip is moved transversely of its length in a cutting operation, the prongs positioned along the leading edge of the strip present their cutting edges to the work and lean into it to cut, and the prongs along the following edge of the strip present their flat faces to the work and lean away from it so that the trailing cutting edges are buffed by it.

PETER C. NEILSEN.

REFERENCES CITED

The following references are of record in the file of this patent:

UNITED STATES PATENTS

| Number | Name | Date |
|---|---|---|
| 339,191 | Jones | Apr. 6, 1886 |
| 1,939,631 | Randall | Dec. 12, 1933 |
| 2,103,176 | Randall | Dec. 21, 1937 |
| 2,125,211 | Vogel, M. | July 26, 1938 |
| 2,137,467 | Vogel, R. | Nov. 22, 1938 |
| 2,416,203 | Neilsen | Feb. 18, 1947 |